United States Patent
Loving

(10) Patent No.: US 8,347,735 B2
(45) Date of Patent: Jan. 8, 2013

(54) METHOD AND APPARATUS FOR MAINTAINING FLOW METER TUBE AMPLITUDE OVER A VARIABLE TEMPERATURE RANGE

(75) Inventor: Roger Scott Loving, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 123 days.

(21) Appl. No.: 12/991,983

(22) PCT Filed: Jun. 5, 2008

(86) PCT No.: PCT/US2008/065882
§ 371 (c)(1),
(2), (4) Date: Nov. 10, 2010

(87) PCT Pub. No.: WO2009/148451
PCT Pub. Date: Dec. 10, 2009

(65) Prior Publication Data
US 2011/0072912 A1    Mar. 31, 2011

(51) Int. Cl.
*G01F 1/84* (2006.01)
(52) U.S. Cl. .................................. 73/861.356
(58) Field of Classification Search ......... 73/861.355–861.357; 128/748
See application file for complete search history.

(56) References Cited

U.S. PATENT DOCUMENTS

| | | | |
|---|---|---|---|
| 4,187,721 A | 2/1980 | Smith | |
| 4,768,384 A | 9/1988 | Flecken et al. | |
| 5,052,231 A | 10/1991 | Christ et al. | |
| 5,535,752 A * | 7/1996 | Halperin et al. | 600/483 |
| 5,907,104 A | 5/1999 | Cage et al. | |
| 2010/0170322 A1* | 7/2010 | Van Cleve et al. | 73/1.16 |

FOREIGN PATENT DOCUMENTS

| | | |
|---|---|---|
| EP | 1567834 A2 | 8/2005 |
| JP | 2206722 | 8/1990 |
| RU | 2320964 C2 | 3/2008 |
| WO | 0102816 A2 | 11/2001 |
| WO | 2004053428 A2 | 6/2004 |
| WO | 2006104485 A1 | 5/2006 |

\* cited by examiner

*Primary Examiner* — Jewel V Thompson
(74) *Attorney, Agent, or Firm* — The Ollila Law Group LLC

(57) ABSTRACT

A method for operating a flow meter is provided. The flow meter includes a driver and pickoff sensors coupled to a flow tube. The driver is adapted to vibrate the flow tube in response to a drive signal. The method comprises setting a target pickoff voltage and measuring a flow meter temperature. The method further comprises generating a temperature compensated target pickoff voltage and controlling the drive signal to maintain a temperature compensated flow tube amplitude.

30 Claims, 4 Drawing Sheets

METHOD AND APPARATUS FOR MAINTAINING FLOW METER TUBE AMPLITUDE OVER A VARIABLE TEMPERATURE RANGE

TECHNICAL FIELD

The present invention relates to a flow meter, and more particularly, to a flow meter capable of maintaining a constant flow tube amplitude over a variable temperature range.

BACKGROUND OF THE INVENTION

It is generally known to use Coriolis effect mass flow meters to measure mass flow and other information for materials flowing through a conduit in the flow meter. Exemplary Coriolis flow meters are disclosed in U.S. Pat. No. 4,109,524, U.S. Pat. No. 4,491,025, and Re. 31,450 all to J. E. Smith et al. These flow meters have one or more conduits of straight or curved configuration. Each conduit configuration in a Coriolis mass flow meter has a set of natural vibration modes, which may be of simple bending, torsional, or coupled type. Each conduit can be driven to oscillate at a preferred mode.

Material flows into the flow meter from a connected pipeline on the inlet side of the flow meter, is directed through the conduit or conduits, and exits the flow meter through the outlet side of the flow meter. The natural vibration modes of the vibrating, material filled system are defined in part by the combined mass of the conduits and the material flowing within the conduits.

When there is no flow through the flow meter, a driving force applied to the conduit causes all points along the conduit to oscillate with identical phase or small initial fixed phase offset which can be corrected. As material begins to flow through the flow meter, Coriolis forces cause each point along the conduit to have a different phase. For example, the phase at the inlet end of the flow meter lags the phase at the centralized driver position, while the phase at the outlet leads the driver. Pickoff sensors on the conduit(s) produce sinusoidal signals representative of the motion of the conduit(s). Signals output from the pickoff sensors are processed to determine the phase difference between the pickoff sensors. The phase difference between the two or more pickoff sensors is proportional to the mass flow rate of material through the conduit(s).

Meter electronics generates a drive signal to operate the driver and determines a mass flow rate and other properties of a material from signals received from the pickoff sensors. The driver may comprise one of many well known arrangements, however, a magnet mounted to one conduit and an opposing drive coil mounted to the other conduit or a fixed base has received great success in the flow meter industry. An alternating current is passed to the drive coil for vibrating both conduits at a desired flow tube amplitude and frequency. It is also known in the art to provide the pickoff sensors as a magnet and coil arrangement very similar to the driver arrangement. However, while the driver receives a current which induces a motion, the pickoff sensors can use the motion provided by the driver to induce a voltage. The general operating principles of the driver and pickoff sensors are generally known in the art.

In many applications, the drive signal is determined at least in part by the pickoff signals. Once an initial drive signal is applied to the driver to induce the meter to vibrate, the pickoff sensors maintain a certain velocity. It is known in the art for the meter electronics to control the drive signal according to "displacement" or "positional" type control. In other words, meter electronics generates and applies drive signals to the driver that maintain a certain amplitude in the pickoff signals. The amplitude of the voltage signal generated by the movement of the pickoff is generally designed to be proportional to the amplitude of the sinusoidal displacement of the flow tube, and this relationship is often expressed in terms of voltage/hertz. The pickoff signal amplitude is a function of the following components: the frequency of pickoff oscillation, the pickoff's magnetic field, the pickoff coil wire length, and the pickoff's amplitude of motion. It is typical in the art for the system frequency of operation to be measured by the electronics, while both the magnetic field and the coil wire length are assumed to be constants. Control of the flow tube displacement amplitude is therefore accomplished by maintaining a target pickoff signal voltage amplitude, often expressed in terms of voltage/hertz.

A problem arises with this amplitude relationship when the flow meter is exposed to either high environment temperatures or high process fluid temperatures. Both can cause the driver and pickoff sensor temperatures to increase. As the temperature increases, the magnetic field of both the driver and the pickoff sensors decreases thus causing the pickoff output voltage to decrease If the drive signal is set to maintain the pickoff output voltage as a constant voltage/Hertz relationship, the drive signal is then increased, which increases the flow tube displacement amplitude in order to increase the pickoff voltage amplitude. The resulting higher flow tube amplitude causes several unwanted effects. From a structural viewpoint, the higher tube amplitude results in higher tube stresses. Differing flow tube amplitudes can also drive unwanted vibrational modes which impress themselves onto the pickoff signal causing measurement errors. Additionally, the higher tube amplitude requires more drive power. In many situations, the power available may be limited by safety approval ratings or by manufacturing specifications. The drive power requirements are increased to an even greater degree in high temperature environments because the drive magnet's efficiency decreases. There is a need in the art to provide a method for maintaining a constant flow tube amplitude in the presence of high temperatures. The present invention solves this and other problems and an advance in the art is achieved.

ASPECTS

According to an aspect of the invention, a method for operating a flow meter including a driver and pickoff sensors coupled to a flow tube, the driver being adapted to vibrate the flow tube in response to a drive signal, the method comprises the steps of:

setting a target pickoff voltage;

measuring a flow meter temperature;

generating a temperature compensated target pickoff voltage; and controlling the drive signal to maintain the temperature compensated target pickoff voltage.

Preferably, the method further comprises the step of identifying a magnetic material of the pickoff sensors and wherein the step of generating a temperature compensated target pickoff voltage comprises compensating for a change in a magnetic field strength of the pickoff sensors.

Preferably, the step of generating a temperature compensated target pickoff voltage comprises adjusting the target pickoff voltage using a coefficient of Br for the magnetic material of the pickoff sensors.

Preferably, the step of generating a temperature compensated target pickoff voltage comprises using the following correlation:

$$\frac{Temp.Coef.Br \times \text{Pickoff voltage}}{\text{frequency}} =$$

tube amplitude × magnetic field strength × coil length.

Preferably, the method further comprises the step of setting a meter design temperature, wherein the temperature compensated target pickoff voltage is substantially equal to the target pickoff voltage when the measured meter temperature is within a threshold limit of the meter design temperature.

Preferably, the threshold limit comprises a user settable value.

Preferably, the threshold limit comprises a predetermined value based on the pickoff sensors.

Preferably, the step of generating a temperature compensated target pickoff voltage comprises retrieving a stored value based on a difference between a meter design temperature and the measured meter temperature.

According to another aspect of the invention, a method for operating a flow meter including a driver and pickoff sensors coupled to a flow tube, the driver being adapted to vibrate the flow tube in response to a drive signal, the method comprises the steps of:
  setting a target pickoff voltage;
  measuring a flow meter temperature;
  comparing the measured flow meter temperature to a meter design temperature; and
  generating a temperature compensated target pickoff voltage if the measured flow meter temperature varies from the meter design temperature by more than a threshold limit.

Preferably, the method further comprises the step of controlling the drive signal to maintain the temperature compensated target pickoff voltage.

Preferably, the method further comprises the step of identifying a magnetic material of the pickoff sensors and wherein the step of generating a temperature compensated target pickoff voltage comprises compensating for a change in a magnetic field strength of a pickoff sensor magnet.

Preferably, the step of generating a temperature compensated target pickoff voltage comprises adjusting the target pickoff voltage using a coefficient of Br for the pickoff sensor magnet.

Preferably, the step of generating a temperature compensated target pickoff voltage comprises using the following correlation:

$$\frac{Temp.Coef.Br \times \text{Pickoff voltage}}{\text{frequency}} =$$

tube amplitude × magnetic field strength × coil length.

Preferably, the step of generating a temperature compensated target pickoff voltage comprises retrieving a stored value based on a difference between a meter design temperature and the measured meter temperature.

Preferably, the threshold limit comprises a user settable value.

Preferably, the threshold limit comprises a predetermined value based on the pickoff sensors.

According to another aspect of the invention, a method for maintaining a flow tube amplitude of a flow meter over a variable temperature range, comprises the steps of:
  applying a drive signal to a driver coupled to a flow tube, the driver adapted to maintain a target pickoff voltage of a plurality of pickoff sensors coupled to the flow tube;
  measuring a flow meter temperature;
  generating a temperature compensated target pickoff voltage using a temperature coefficient of Br for a magnetic material of the plurality of pickoff sensors; and
  controlling the drive signal to maintain the temperature compensated target pickoff voltage, when the difference between the measured flow meter temperature and a meter design temperature exceeds a threshold limit.

Preferably, the step of controlling the drive signal comprises adjusting the drive power.

Preferably, the threshold limit comprises a user settable value.

Preferably, the threshold limit comprises a predetermined value based on the pickoff sensors.

Preferably, the step of generating a temperature compensated target pickoff voltage comprises using the following correlation:

$$\frac{Temp.Coef.Br \times \text{Pickoff voltage}}{\text{frequency}} =$$

tube amplitude × magnetic field strength × coil length.

Preferably, the step of generating a temperature compensated target pickoff voltage comprises retrieving a stored value based on a difference between the meter design temperature and the measured meter temperature.

According to another aspect of the invention, a flow meter, comprising:
  a flow tube;
  a driver coupled to the flow tube and adapted to vibrate the flow tube in response to a drive signal;
  a plurality of pickoff sensors coupled to the flow tube; and
  meter electronics configured to:
    set a pickoff voltage;
    monitor a flow meter temperature;
    generate a temperature compensated pickoff voltage; and
    control the drive signal to maintain the temperature compensated target pickoff voltage.

Preferably, the meter electronics is further configured to identify a magnetic material of the pickoff sensors and generate the temperature compensated pickoff voltage by compensating for a change in a magnetic field strength of the pickoff sensors.

Preferably, the meter electronics is further configured to adjust the target pickoff voltage using a coefficient of Br for the magnetic material of the pickoff sensors.

Preferably, the meter electronics is further configured to generate a temperature compensated target pickoff voltage using the following equation:

$$\frac{Temp.Coef.Br \times \text{Pickoff voltage}}{\text{frequency}} =$$

tube amplitude × magnetic field strength × coil length.

Preferably, the meter electronics is further configured to set a meter design temperature, wherein the temperature compensated target pickoff voltage is substantially equal to the target pickoff voltage when the measured meter temperature is within a threshold limit of the meter design temperature.

Preferably, the meter electronics is further configured to accept a user settable value for the threshold limit.

Preferably, the meter electronics is further configured to store a predetermined value for the threshold limit based on the pickoff sensors.

Preferably, the meter electronics is further configured to retrieve a stored value based on a difference between a meter design temperature and the measured temperature and use the stored value to generate the temperature compensated pickoff voltage.

DETAILED DESCRIPTION OF THE INVENTION

FIGS. 1-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
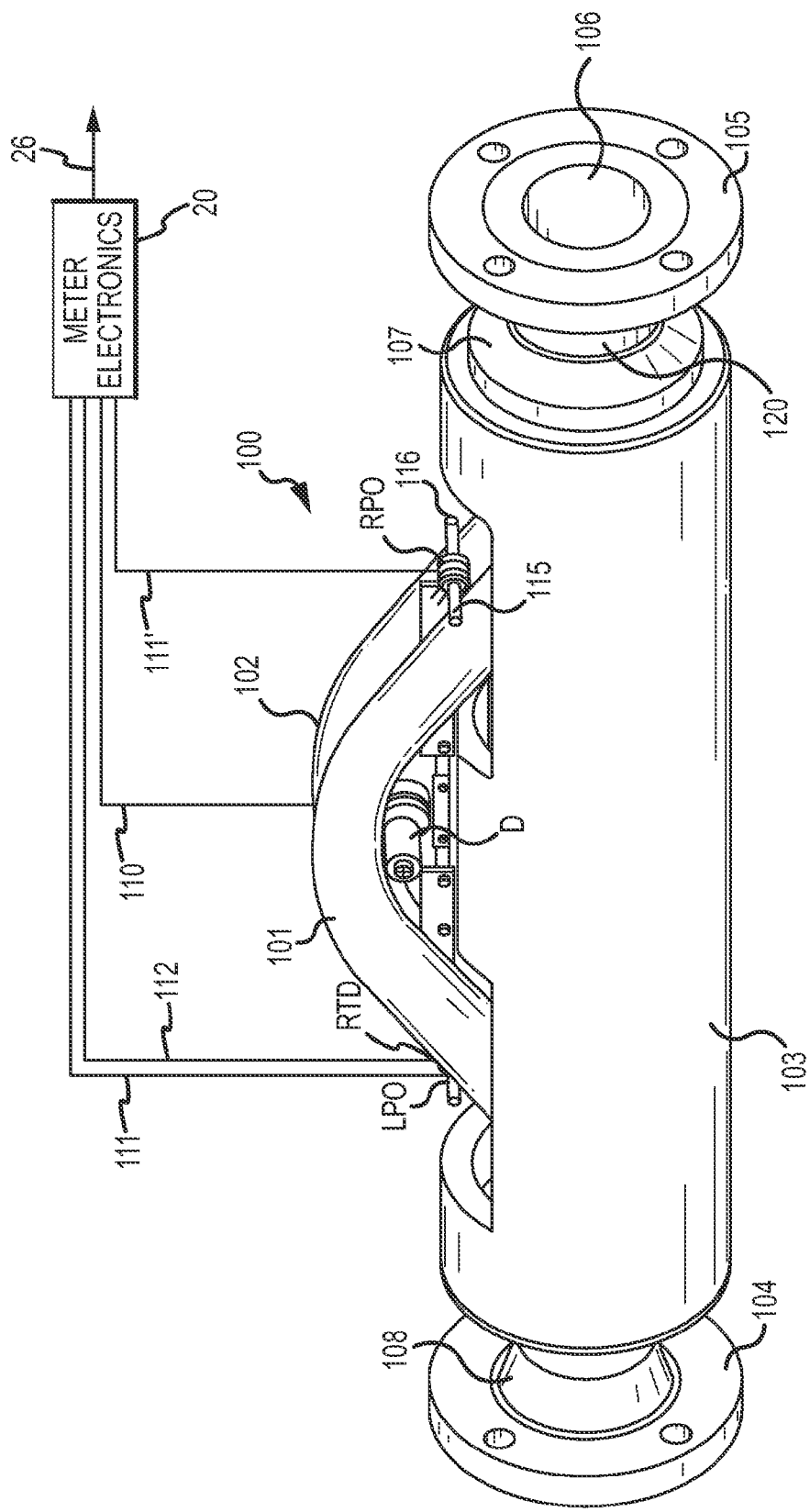
FIG. 1 shows a flow meter 100 according to an embodiment of the invention.

FIG. 1 shows a flow meter 100 and meter electronics 20 according to an embodiment of the invention. According to an embodiment of the invention, the flow meter 100 comprises a Coriolis flow meter. The present invention, however, is not limited to applications incorporating Coriolis flow meters, and it should be understood that the present invention could be used with other types of flow meters. Meter electronics 20 is connected to the flow meter assembly 100 via leads 110, 111, 111', and 112 to provide temperature, density, mass flow rate, volume flow rate, and totalized mass flow information over path 26. Meter drive and pickoff signals are also transmitted over path 26.

The flow meter assembly 100 comprises a spacer 103 enclosing the lower portion of the flow tubes 101, 102 which are internally connected on their left ends to flange 104 via its neck 108 and which are connected on their right ends via neck 120 to flange 105, and manifold 107. Also shown in FIG. 1 are the outlet 106 of flange 105, left pickoff LPO, right pickoff RPO, and driver D. Flow meter 100 is adapted when in use to be connected via flanges 104 and 105 to a pipeline or the like. The right pickoff RPO is shown in some detail and includes magnet structure 115 and coil structure 116. Although only two pickoff sensors LPO, RPO are shown, it should be understood that any number of pickoff sensors could be used. Also attached to the flow meter assembly 100 is a temperature measurement device such as an RTD sensor. Although only one RTD is shown attached to meter assembly 100, this is purely for clarity and it should be understood that in practice, an RTD or other temperature measuring device may be connected to each of the pickoff sensors LPO, RPO as well as the driver D. Each of the RTD sensors can be connected to the meter electronics 20 via leads, such as lead 112.

Meter electronics 20 is adapted to apply a drive signal to the driver D via lead 110. The alternating polarity of the drive signal causes the tubes 101 and 102 to vibrate at a given flow tube amplitude and frequency. The flow tube amplitude and frequency vary depending on the drive signal provided by meter electronics 20. In response to the flow tube vibration, the magnet and coil assembly of the pickoff sensors LPO and RPO induce voltages which are received by meter electronics 20 via leads 111 and 111' respectively. According to an embodiment of the invention, meter electronics 20 controls the meter assembly 100 according to the "displacement" or "positional" type control method. Therefore, meter electronics 20 sets the drive signal with the attempt to maintain a target pickoff voltage. The target pickoff voltage may be set by the user in the field, or alternatively, may be chosen in advance. In some embodiments, a default target pickoff voltage may be set based on the flow meter detected and/or the process fluid. The drive power provided by meter electronics 20 must be large enough to overcome the meter's damping and spring forces and to maintain a sufficient tube amplitude to maintain the target pickoff voltage. The pickoff voltage can be calculated as follows.

As the flow tubes 101 and 102 vibrate due to the driver D, the magnet and coil assembly of the pickoffs LPO, RPO induce a pickoff voltage. The pickoff voltage produced is a function of four attributes of the meter assembly and can be represented as follows.

$$\text{Pickoff voltage} = \text{tube amplitude} \times \text{frequency} \times \text{magnetic field strength} \times \text{coil length} \quad (1)$$

However, the frequency is subject to fluctuations based on the process fluid density and temperature and thus can present issues in controlling the pickoff voltage. On the other hand, if instead of attempting to maintain a target pickoff voltage, meter electronics 20 attempts to maintain a pickoff voltage expressed in terms of voltage/hertz, the expression is automatically compensated for changes in sensor frequency due to fluctuations in process fluid density and temperature. Therefore, the pickoff voltage can be better expressed as:

$$\frac{\text{Pickoff voltage}}{\text{frequency}} = \text{tube amplitude} \times \text{magnetic field strength} \times \text{coil length} \quad (2)$$

The relationship represented by equation 2 provides an adequate representation of the pickoff voltage for many applications. By assuming a constant magnetic field strength and a constant coil length, the pickoff voltage can be kept at its target by adjusting only the tube amplitude, which can be controlled by the drive signal, as is generally known in the art.

Figure 2:
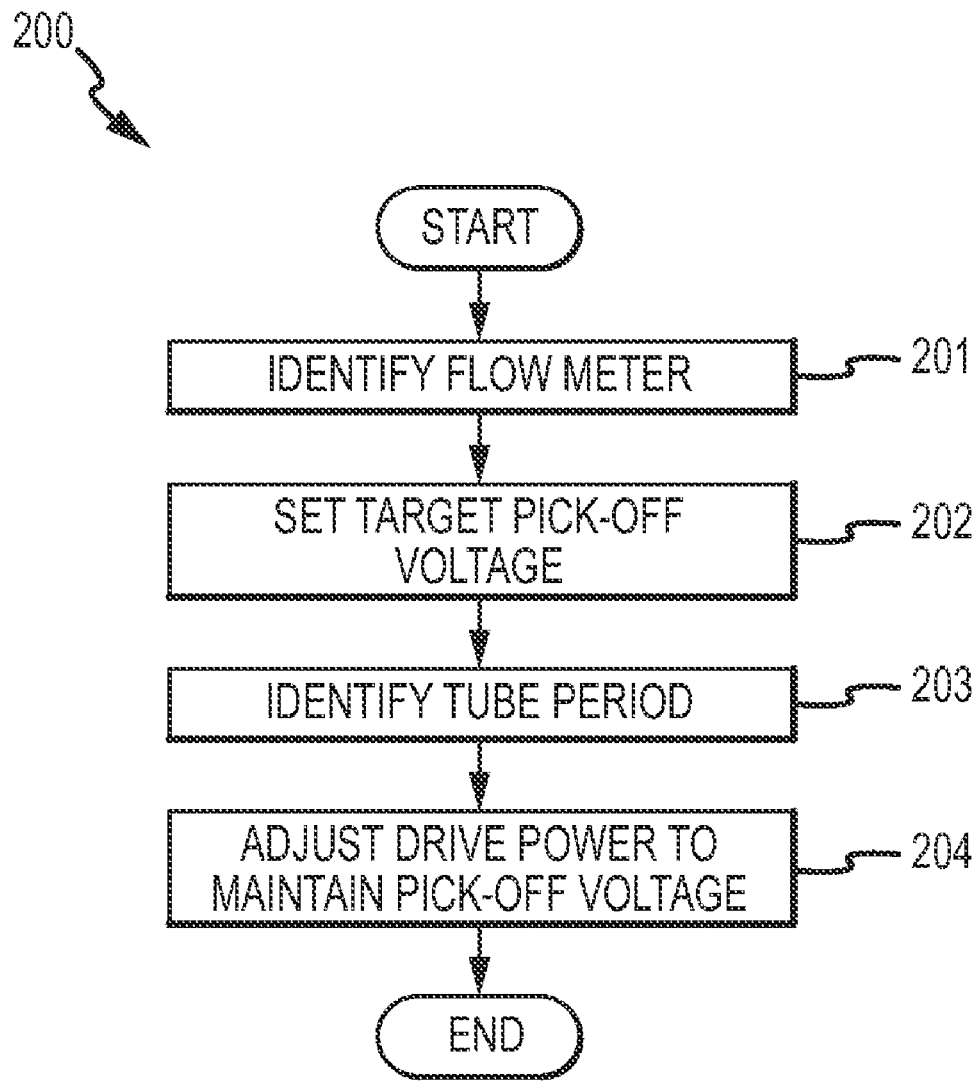
FIG. 2 illustrates a flow diagram of the operations performed by meter electronics.

FIG. 2 illustrates a flow diagram of an initialization algorithm 200 performed by meter electronics 20 to operate flow meter assembly 100. The algorithm 200 may be stored in a processor or the like and retrieved by meter electronics 20 or some other processor or software program. Initialization algorithm 200 assures start up of the flow meter assembly 100 regardless of the type of flow meter or process fluid being measured. Process 200 starts in step 201 where meter electronics 20 identifies the particular flow meter being used. The identification may be accomplished by sending/receiving a signal to the flow meter 100, or alternatively, a user may manually identify the flow meter 100. Once the flow meter 100 is identified the target pickoff voltage is set in step 202. The target pickoff voltage may be set based on the particular flow meter being used, or alternatively, the target pickoff voltage may be set based on user parameters input manually. In step 203 the tube period is determined. The tube period is needed in conjunction with the pickoff voltage in order to achieve proper drive control. In step 204 the drive power is adjusted to maintain the target pickoff voltage. This is the set point for the drive algorithm and is sometimes referred to as a displacement target. Once the drive power is set, initialization routine 200 is complete.

Figure 3:
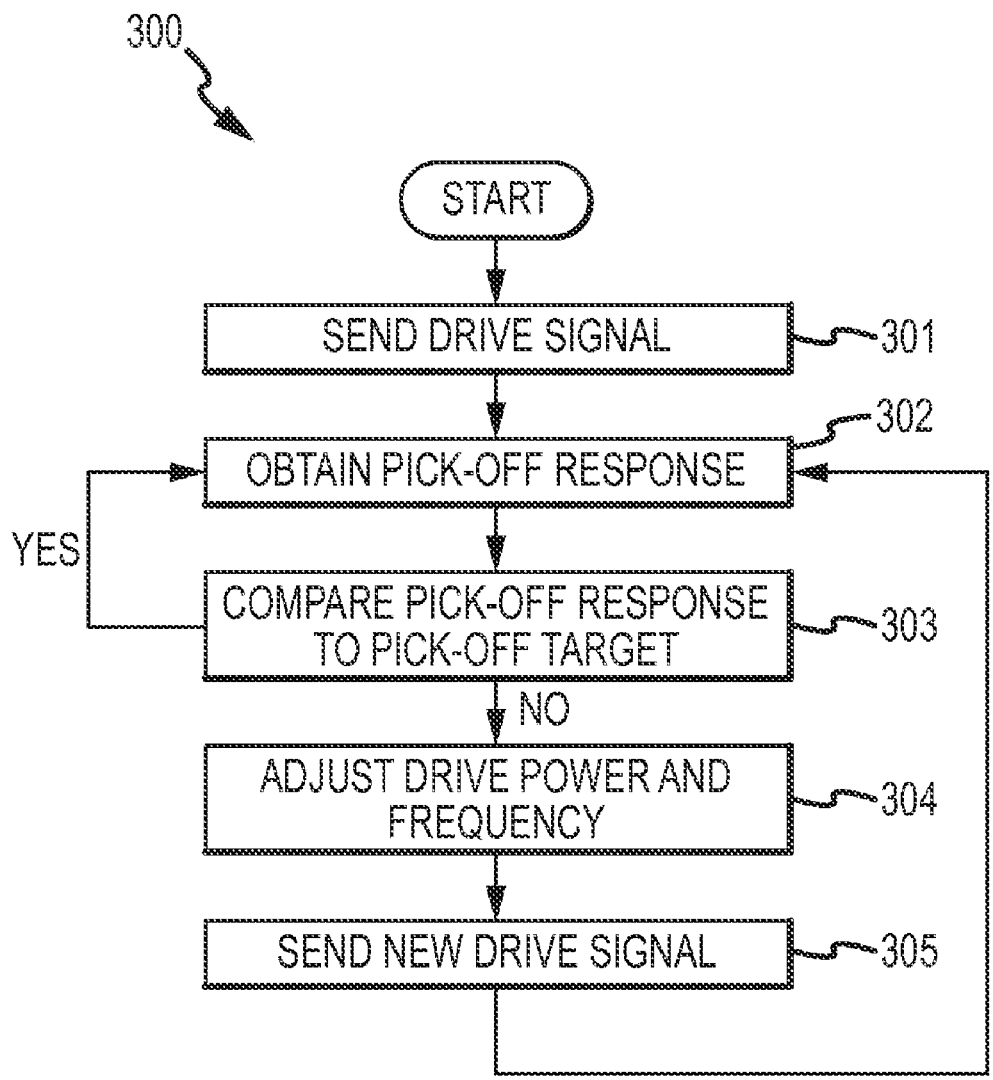
FIG. 3 illustrates another flow diagram of the operations performed by meter electronics showing how the control algorithm maintains a constant flow tube amplitude after the initial running conditions of FIG. 2 have been set.

FIG. 3 illustrates a process 300 for normal operation of the flow meter 100 performed by meter electronics 20. Once the drive target is set in process 200, meter electronics 20 sends the desired drive target to the driver D in step 301. The drive target comprises the drive signal sent to the driver D, which in turn vibrates the flow tubes 101 and 102. In step 302, the pickoff sensors LPO, RPO continually send signals to meter electronics 20 indicating the pickoff voltage. This pickoff voltage is converted to a pickoff voltage as shown in equation (2) above. In step 303, meter electronics 20 determines whether the actual pickoff voltage is equal to the target pickoff voltage. If the answer is yes, the process returns to step 302 to check the pickoff voltage once again. Meter electronics 20 can continually measure the pickoff voltage for a comparison to the target pickoff voltage. If however, the actual pickoff voltage is different from the target pickoff voltage, or alternatively, exceeds a predetermined threshold difference, process 300 continues to step 304 to adjust the desired drive target. Therefore, if the actual pickoff voltage is not equal to the target pickoff voltage, process 300 changes the only known variable, tube amplitude, by changing the drive signal. The modified drive signal is sent to the driver D in step 305. The process 300 returns again to step 302 where the pickoff voltage is determined once again.

The process 300 described above provides adequate flow meter operation so long as the temperature of the system remains substantially constant or within a threshold difference of a meter design temperature. A problem arises however, when the temperature of the pickoff sensors LPO, RPO, or the driver D rises above the ambient meter design temperature, typically 20° C. (68° F.). It should be understood that the flow meter 100 may have a design temperature different than 20° C. (68° F.) and the particular design temperature should not limit the scope of the invention. Similarly, while the description that follows mainly addresses a rise in temperature, the correction is equally applicable to drops in temperature. The problems associated with temperature changes arise in part because as the temperature of the permanent magnet of the pickoff sensors LPO, RPO, and driver D rises, the magnetic field strength associated with those magnets is reduced. Similarly, when the temperature of the permanent magnet of the pickoff sensors, LPO, RPO, and the driver D drops, the magnetic field strength associated with those magnets increases. Recall from equation (2) that the pickoff voltage is determined in part by the magnetic field strength. Therefore, in high temperature environments the decrease in magnetic field strength also decreases the pickoff voltage, which meter electronics 20 is programmed to maintain. In order for the pickoff voltage to generate the same amplitude signal (mV/Hz), the flow tubes 101, 102 must move a greater distance, i.e., the flow tube amplitude must increase. An increase in flow tube amplitude is not necessarily desired as it creates the potential for vibration related changes in the pickoff signal as well as additional tube stress. Furthermore, the drive signal must be increased in order to generate the increase in flow tube amplitude. Therefore, a greater amount of power is consumed during operation at increased temperatures.

In addition to the pickoff sensors' magnetic field being reduced at higher temperatures, the drive magnet also has a reduced magnetic field strength at higher temperatures and does not respond as efficiently to the pickoff sensors' LPO, RPO demands for higher amplitude as it would at lower temperatures. The resulting drive inefficiency requires more drive current from the transmitter and therefore reduces the reserve amount of intrinsically safe drive current available to drive the tubes 101 and 102 in high fluid damping conditions.

This decrease in magnetic field strength associated with increased temperatures is well known in the magnetic industry as the "Temperature Coefficient of Br." The decrease in magnetic field strength is not a permanent loss and returns to the previous value as the temperature goes down. The temperature coefficient of Br is based on the type of magnetic material used and forms a part of the material specifications of all magnets manufactured. The temperature coefficients of many common magnets are known and are expressed as a –% magnetic field density per ° C. For example, it is known in the Coriolis flow meter industry to use samarium cobalt magnets, which have a temperature coefficient of Br of approximately –0.035%/° C. It should be understood that the precise coefficient of Br will depend on the particular magnet used and the use of samarium cobalt magnets should not limit the scope of the invention.

According to an embodiment of the invention, a change in temperature is compensated for by generating a temperature compensated target pickoff voltage. The temperature compensated target pickoff voltage may compensate for changes in the pickoff voltage attributable to a change in the flow meter's temperature. The temperature compensated target pickoff voltage may be calculated using the temperature coefficient of Br, or by using another temperature compensating value. Furthermore, the temperature compensated target pickoff voltage may be obtained from a stored value. The stored value may be based on a difference between a measured meter temperature and a meter design temperature. According to another embodiment, the stored value may be based on previously obtained data. It should be understood that the present invention should not be limited to the use of the temperature coefficient of Br. However, if the temperature coefficient of Br for the magnet used in the pickoff sensors LPO, RPO and the driver D is inserted into equation (2), a temperature compensated target pickoff voltage can be calculated using equation (3).

$$\frac{Temp.Coef.Br \times \text{Pickoff voltage}}{\text{frequency}} = \text{tube amplitude} \times \text{magnetic field strength} \times \text{coil length} \quad (3)$$

If equation (3) is used in determining the temperature compensated target pickoff voltage, the tube amplitude can be stabilized even in environments of increased temperature. This is because even though the magnetic field strength decreases as temperature increases, the temperature compensated target pickoff voltage of equation (3) compensates for this decrease in magnetic field strength. Therefore, meter electronics 20 does not attempt to increase the decreased pickoff voltage created by an increased temperature. Instead, meter electronics 20 determines a new temperature compensated target pickoff voltage, which takes into account the change in temperature.

Figure 4:
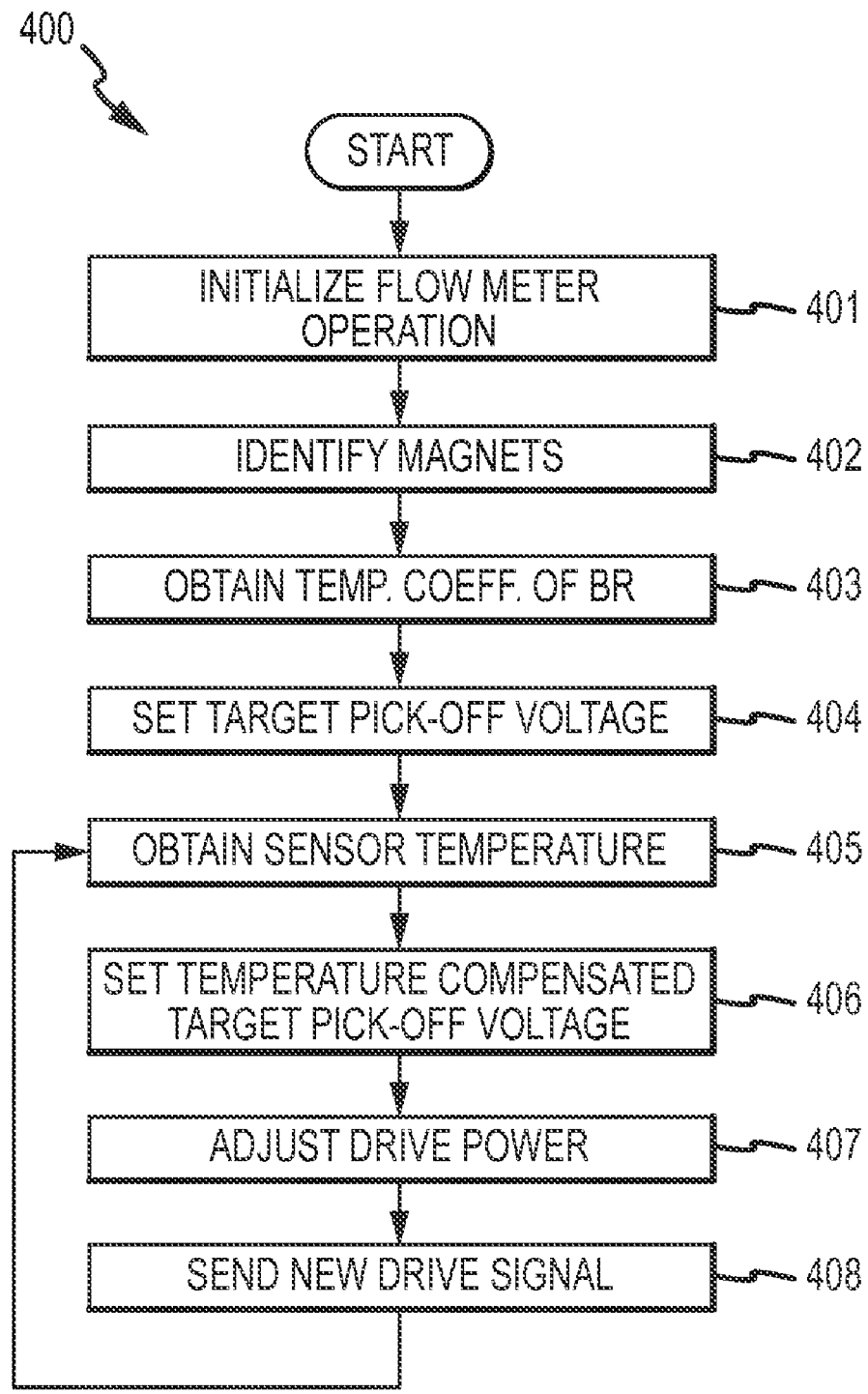
FIG. 4 illustrates an initialization flow diagram of the operations performed by meter electronics according to an embodiment of the invention.

FIG. 4 illustrates a process 400 performed by meter electronics 20 for operating the flow meter 100 according to an embodiment of the invention. Process 400 starts in step 401 by initializing flow meter operation. The initialization can include the steps of process 200 shown in FIG. 2, or alternatively, can include another initialization routine that would identify the particular flow meter and set an initial target pickoff voltage. Process 400 continues in step 402 by identifying the particular magnetic material used in the pickoff sensors LPO, RPO and the driver D is determined. Step 402 may not be necessary if the magnetic material is already known. Once the magnetic material is known, meter electronics 20 obtains a temperature coefficient of Br for the magnets in step 403. The temperature coefficient of Br can be obtained from stored values or alternatively, can be entered manually by a user. It should be understood that although in many applications, the type of magnet used in the pickoff sensors and the driver are of the same material, a different type of magnet could be used, in which case, multiple coefficients of Br would need to be used to compensate for a change in temperature. In step 404 a target pickoff voltage is set. The target pickoff voltage can be a user settable value, or may be based on a meter design temperature. As mentioned above, a flow meter, such as flow meter 100 may have a meter design temperature. Therefore, the target pickoff voltage may be based on the magnetic properties of the driver and pickoff coils at the meter design temperature.

In step 405, a flow meter temperature is obtained using, for example, RTD sensors. The flow meter temperature may be representative of the process fluid temperature. According to another embodiment of the invention, the flow meter temperature may represent the temperature of the driver D or pickoff sensors LPO, RPO. According to yet another embodiment, the flow meter temperature may represent the temperature of the flow tubes 101, 102.

Based on the temperature received in step 405, a temperature compensated target pickoff voltage may be generated in step 406. According to one embodiment, the temperature compensated target pickoff voltage is only generated in step 406 if the difference between the meter design temperature and the temperature measured in step 405 exceeds a threshold limit. The threshold limit may be user settable. Alternatively, the threshold limit may be based on the particular flow meter used. In yet other embodiments, the threshold limit is based on the magnetic material used for the pickoff sensors, LPO, RPO. Using the measured temperature, the meter design temperature and equation (3), the temperature compensated pickoff voltage can be calculated. In step 407 the drive power is adjusted in order to achieve the temperature compensated target pickoff voltage. This new drive power is sent to the driver D in step 408. This process 400 can be iterated by continually obtaining a new flow meter temperature for a predetermined amount of time or until a user ends process 400.

The process 400 can be used to control the drive signal sent by meter electronics 20 to maintain the temperature compensated target pickoff voltage rather than the initially set target pickoff voltage. Thus, although the pickoff voltage changes with temperature, the target pickoff voltage is adjusted to compensate for changes in the pickoff voltage that are attributable to a change in temperature. According to one embodiment, the temperature compensated target pickoff voltage is generated using the Temperature Coefficient of Br in order to compensate for the change in the magnetic field properties of the magnets used in the pickoff sensors LPO, RPO. Therefore, meter electronics 20 does not raise the tube amplitude in response to a decreased pickoff voltage caused by a rise in temperature, but instead generates a new temperature compensated target pickoff voltage, which takes into account the change in the magnetic field strength. The present invention provides a method that can both decrease the power demanded by the flow meter and also increase the flow tube life.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other flow meters, and not just to the embodiments described above and shown in the accompanying figures. Accordingly, the scope of the invention should be determined from the following claims.

I claim:

1. A method for operating a flow meter including a driver and pickoff sensors coupled to a flow tube, the driver being adapted to vibrate the flow tube in response to a drive signal, the method comprising steps of:
   setting a target pickoff voltage;
   measuring a flow meter temperature;
   generating a temperature compensated target pickoff voltage; and
   controlling the drive signal to maintain the temperature compensated target pickoff voltage.

2. The method of claim 1, further comprising a step of identifying a magnetic material of the pickoff sensors and wherein the step of generating a temperature compensated target pickoff voltage comprises compensating for a change in a magnetic field strength of the pickoff sensors.

3. The method of claim 2, wherein the step of generating a temperature compensated target pickoff voltage comprises adjusting the target pickoff voltage using a coefficient of Br for the magnetic material of the pickoff sensors.

4. The method of claim 3, wherein the step of generating a temperature compensated target pickoff voltage comprises using the following equation:

$$\frac{Temp.Coef.Br \times \text{Pickoff voltage}}{\text{frequency}} =$$

tube amplitude × magnetic field strength × coil length.

5. The method of claim 1, further comprising a step of setting a meter design temperature, wherein the temperature compensated target pickoff voltage is substantially equal to the target pickoff voltage when the measured meter temperature is within a threshold limit of the meter design temperature.

6. The method of claim 5, wherein the threshold limit comprises a user settable value.

7. The method of claim 5, wherein the threshold limit comprises a predetermined value based on the pickoff sensors.

8. The method of claim 1, wherein the step of generating a temperature compensated target pickoff voltage comprises retrieving a stored value based on a difference between a meter design temperature and the measured meter temperature.

9. A method for operating a flow meter including a driver and pickoff sensors coupled to a flow tube, the driver being adapted to vibrate the flow tube in response to a drive signal, the method comprising steps of:
   setting a target pickoff voltage;
   measuring a flow meter temperature;
   comparing the measured flow meter temperature to a meter design temperature; and
   generating a temperature compensated target pickoff voltage if the measured flow meter temperature varies from the meter design temperature by more than a threshold limit.

10. The method of claim 9, further comprising a step of controlling the drive signal to maintain the temperature compensated target pickoff voltage.

11. The method of claim 9, further comprising a step of identifying a magnetic material of the pickoff sensors and wherein the step of generating a temperature compensated target pickoff voltage comprises compensating for a change in a magnetic field strength of a pickoff sensor magnet.

12. The method of claim 11, wherein the step of generating a temperature compensated target pickoff voltage comprises adjusting the target pickoff voltage using a coefficient of Br for the pickoff sensor magnet.

13. The method of claim 12, wherein the step of generating a temperature compensated target pickoff voltage comprises using the following equation:

$$\frac{Temp.Coef.Br \times \text{Pickoff voltage}}{\text{frequency}} = \text{tube amplitude} \times \text{magnetic field strength} \times \text{coillength}.$$

14. The method of claim 9, wherein the step of generating a temperature compensated target pickoff voltage comprises retrieving a stored value based on a difference between a meter design temperature and the measured meter temperature.

15. The method of claim 9, wherein the threshold limit comprises a user settable value.

16. The method of claim 9, wherein the threshold limit comprises a predetermined value based on the pickoff sensors.

17. A method for maintaining a flow tube amplitude of a flow meter over a variable temperature range, comprising steps of:
   applying a drive signal to a driver coupled to a flow tube, the driver adapted to maintain a target pickoff voltage of a plurality of pickoff sensors coupled to the flow tube;
   measuring a flow meter temperature;
   generating a temperature compensated target pickoff voltage using a temperature coefficient of Br for a magnetic material of the plurality of pickoff sensors; and
   controlling the drive signal to maintain the temperature compensated target pickoff voltage, when the difference between the measured flow meter temperature and a meter design temperature exceeds a threshold limit.

18. The method of claim 17, wherein the step of controlling the drive signal comprises adjusting the drive power.

19. The method of claim 17, wherein the threshold limit comprises a user settable value.

20. The method of claim 17, wherein the threshold limit comprises a predetermined value based on the pickoff sensors.

21. The method of claim 17, wherein the step of generating a temperature compensated target pickoff voltage comprises using the following equation:

$$\frac{Temp.Coef.Br \times \text{Pickoff voltage}}{\text{frequency}} = \text{tube amplitude} \times \text{magnetic field strength} \times \text{coillength}.$$

22. The method of claim 17, wherein the step of generating a temperature compensated target pickoff voltage comprises retrieving a stored value based on a difference between the meter design temperature and the measured meter temperature.

23. A flow meter (100), comprising:
   a flow tube (101, 102);
   a driver (D) coupled to the flow tube (101, 102) and adapted to vibrate the flow tube (101, 102) in response to a drive signal;
   a plurality of pickoff sensors (LPO, RPO) coupled to the flow tube (101, 102); and
   meter electronics (20) configured to:
      set a pickoff voltage;
      monitor a flow meter temperature;
      generate a temperature compensated pickoff voltage; and
      control the drive signal to maintain the temperature compensated target pickoff voltage.

24. The flow meter (100) of claim 23, wherein the meter electronics (20) is further configured to identify a magnetic material of the pickoff sensors (LPO, RPO) and generate the temperature compensated pickoff voltage by compensating for a change in a magnetic field strength of the pickoff sensors (LPO, RPO).

25. The flow meter (100) of claim 24, wherein the meter electronics (20) is further configured to adjust the target pickoff voltage using a coefficient of Br for the magnetic material of the pickoff sensors (LPO, RPO).

26. The flow meter (100) of claim 25, wherein the meter electronics (20) is further configured to generate a temperature compensated target pickoff voltage using the following equation:

$$\frac{Temp.Coef.Br \times \text{Pickoff voltage}}{\text{frequency}} = \text{tube amplitude} \times \text{magnetic field strength} \times \text{coillength}.$$

27. The flow meter (100) of claim 23, wherein the meter electronics (20) is further configured to set a meter design temperature, wherein the temperature compensated target pickoff voltage is substantially equal to the target pickoff voltage when the measured meter temperature is within a threshold limit of the meter design temperature.

28. The flow meter (100) of claim 27, wherein the meter electronics (20) is further configured to accept a user settable value for the threshold limit.

29. The flow meter (100) of claim 27, wherein the meter electronics (20) is further configured to store a predetermined value for the threshold limit based on the pickoff sensors (LPO, RPO).

30. The flow meter (100) of claim 23, wherein the meter electronics (20) is further configured to retrieve a stored value based on a difference between a meter design temperature and the measured temperature and use the stored value to generate the temperature compensated pickoff voltage.

* * * * *